Aug. 31, 1937.    J. E. KLINE    2,091,864
LATHE CENTER
Filed Oct. 12, 1936
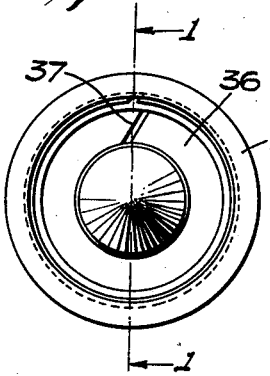
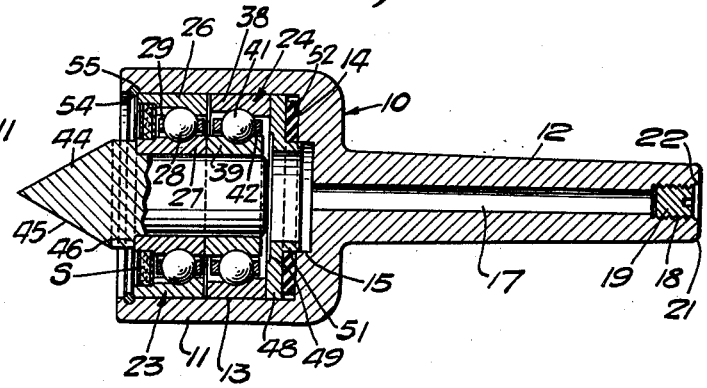
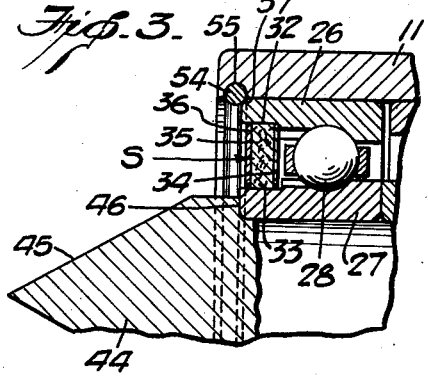
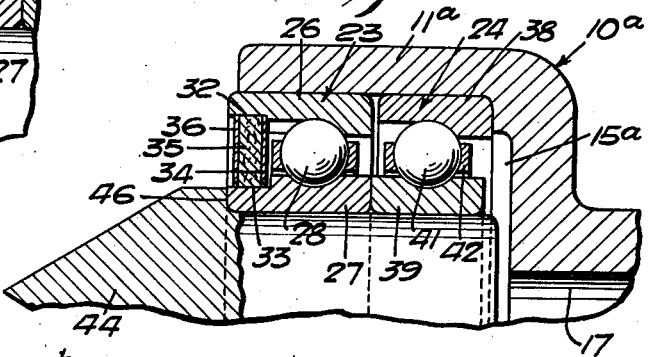
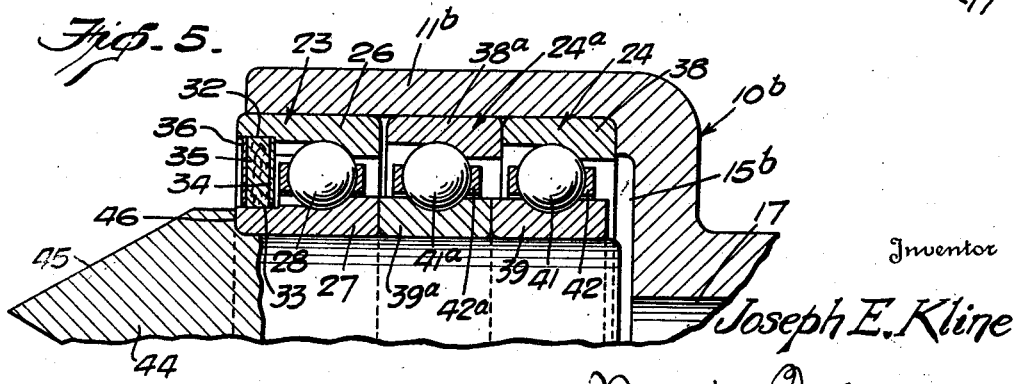
Inventor
Joseph E. Kline
By Norris & Bateman
Attorneys Patented Aug. 31, 1937

2,091,864

UNITED STATES PATENT OFFICE 2,091,864

LATHE CENTER

Joseph E. Kline, Alpena, Mich.

Application October 12, 1936, Serial No. 105,332

13 Claims. (Cl. 82—33)

The present invention relates to lathe centers and more particularly to lathe centers of the character embodying anti-friction bearings.

Although anti-friction lathe centers have been heretofore proposed they have not been altogether satisfactory and in my Patent No. 2,058,322 granted Oct. 20, 1936, I have disclosed improved lathe centers which overcome many of the disadvantages of the lathe centers of the prior art.

It is the primary object of the present invention to generally improve and refine certain features of the lathe centers shown in my aforesaid patent application.

Another object is to provide lathe centers having all of the desirable features of those shown in my aforesaid patent application and further highly valuable characteristics to be hereinafter pointed out.

Further objects of the invention will become apparent as the specification proceeds in connection with the annexed drawing, and from the appended claims.

In the drawing:

Fig. 1 is a longitudinal sectional view of a lathe center embodying the invention and is taken substantially on the line 1—1 of Fig. 2;

Fig. 2 is a front elevational view of the lathe center shown in Fig. 1;

Fig. 3 is a fragmental sectional view on an enlarged scale illustrating the sealing and locking rings of the lathe center shown in Fig. 1;

Fig. 4 is a view similar to Fig. 1 but shows a modified form of lathe center also forming part of my invention; and Fig. 5 is a view similar to Figs. 1 and 4 but illustrates a further modified form of lathe center embodying the invention.

With continued reference to the drawing, wherein similar reference characters have been used to designate like parts throughout the several views thereof, and with particular reference to Figs. 1, 2 and 3, the parts of the lathe center are all carried by a housing or supporting structure 10, having an enlarged cylindrical hollow portion or head 11 and a shank portion 12.

Head 11 is provided with a cylindrical inner wall 13 in which the bearings are mounted, a radial face 14 and a counterbore 15 for a purpose that will presently appear.

Shank 12 is provided with a longitudinal passage 17, for supplying lubricant to the interior of the head and for enabling a punch or other tool to be used to remove the center. The shank is also provided with a threaded recess 18 in which a closure plug 19 is threaded. The end of shank 12 is also preferably provided with chamfered surfaces 21 and 22. Plug 19 functions as a closure for passage 17. Shank 12 is adapted to be held in the lathe in well known manner.

The inner cylindrical surface 13 is bored to an internal diameter to provide a push fit of a pair of antifriction bearings 23 and 24. If desired different sized interchangeable centers may be provided with bearings to fit surface 13 but in any event they are so dimensioned as to provide a push fit.

Bearing 23 comprises an outer ball race 26 and an inner ball race 27 between which a plurality of balls 28 are disposed. A ball retainer and spacer assembly 29 cooperates with balls 28 in well known manner.

Secured to outer race 26 and frictionally and sealingly cooperating with the inner race 27 is a seal assembly S, which is more clearly seen in Fig. 3. With continued reference to this figure, races 26 and 27 are provided with cylindrical surfaces 32 and 33 respectively with which the sealing assembly cooperates. Frictionally engaging surface 32 is an annular plate 34 whose ends meet at an oblique angle. Plate 34 in its natural or unconfined state assumes a larger diameter, with the result that when it is in place it tightly engages surface 32. It is installed by compressing its ends together and forcing it against the shoulder on race 26.

The sealing element proper comprises a washer 35 of felt or other suitable material seating against plate surface 32 and plate 34 and sealingly cooperating with surface 33. A similar plate 36, having its ends 37 meeting at an oblique angle as seen in Fig. 2, is frictionally engaged with surface 32 and clamps sealing member 35 between it and plate 34.

It is accordingly apparent that sealing assembly S prevents lubricant from escaping from the interior of head 11 and also excludes foreign matter from the bearings.

Bearing 23 carries radial loads imposed upon the device, whereas bearing 24 carries both radial and thrust loads. Bearing 24 is similar to bearing 23 and comprises an outer race 38; an inner race 39; balls 41 and a ball retainer 42. Inner race 39 however is offset from the outer race by the location of the bearing raceways in the outside race 38 and inside race 39, whereby the two bearings are maintained in the spaced relationship shown in Fig. 1.

The center employed may be of any desired type. The center 44 illustrated is a machine tool center and is provided with a conical face 45 and a shoulder 46. The reduced portion of the center is mounted in bearings 23 and 24 and it is of a diameter sufficient to provide a hard push fit through their inner races 27 and 39. When it is desired to remove the center, plug 19 may be removed and a punch or other tool inserted in passage 17 and engaged with the center to force it out of races 27 and 39.

As is well understood to workers in the art, a piece of metal undergoing a machining operation heats up and expands, and I have accordingly provided the apparatus with a compensating assembly which automatically compensates for changes in length of the work by allowing the center to recede into the head, and this structure will now be described.

Mounted for axial sliding movement in head 11 is a disc or washer-like member 48 having a push fit with wall 13. Disc 48 is provided with a counterbore 49 in order to provide a running clearance between it and inner race 39 of bearing 24, and it is also provided with a circular flange 51 whose outer diameter is such as to have a push fit within bore 15 of head 11.

Disc 48 is accordingly mounted for guided sliding movement with respect to head 11 and disposed between it and wall 14 of head 11 is a disc 52 of resilient material, such as rubber or the like of the proper ductility. As seen in Fig. 1, member 52 is of a smaller diameter than wall 13, with the result that when pressure is applied thereto it may deform or expand outwardly.

Movement of the bearing and center assembly toward the open end of head 11 under the influence of member 52 is restrained by means of a resilient snap ring 54 which is sprung into a groove 55 in head 11. The ends of ring 54 are spaced apart sufficiently so that when the ring is compressed or contracted it will have a diameter substantially equal to that of wall 13 and may accordingly be readily slipped into place.

As more clearly seen in Fig. 3, groove 55 has a depth slightly greater than the radius of ring 54 and the parts are so dimensioned in order to firmly lock the ring in place. In order to assist in locking the parts the outer race 26 of bearing 23 is provided with a curved face 57 so that when the assembly moves to the left it will overlie ring 54 and positively force the ring into its groove.

The parts of the device are assembled as follows:

Compensator discs 48 and 52 are assembled in head 1 as seen in Fig. 1. The bearings are then pushed into place and the desired center member forced into the bearing bores and sufficient pressure applied to shove them past the position shown in Figs. 1 and 3 and compress member 52. Ring 54 is then sprung into groove 55. The pressure is now relieved and member 52 then forces race 26 into engagement with ring 54 to lock the parts in place, as seen in Figs. 1 and 3. The compensator is at this time preferably exerting a pressure approximately equal to the working capacity of the bearings. When the parts assume this position face 57 of race 26 overlies ring 54 and forces the latter firmly into groove 55, thereby locking it against displacement.

The device having been assembled in the manner just described lubricant is forced through passage 17 until it substantially fills the interior of the head. Plug 19 is then screwed in place and the device is now ready for use.

Shank 12 is mounted in the lathe and the work is gripped between the chuck and center 44 in well known manner. By reason of the antifriction bearings the work may be placed under considerable pressure and yet it will turn freely. As the machining operation proceeds and the work expands in response to the heat generated therein the added pressure upon the center transmits this thrust through bearing 24 to disc 48, which in turn compresses member 52 between it and wall 14 of the head. As previously pointed out, bearings 23 and 24 take the radial loads during the operation of the device and bearing 24 also absorbs the thrust loads. In order that bearing 24 may more efficiently absorb the thrust the outer race thereof is shouldered as seen in Fig. 1.

In Fig. 4 I have illustrated a further form of center embodying certain features of the invention and as many parts are of similar form to those employed in the first form of the invention, similar reference characters have been applied thereto. In this form of the invention the housing 10a is provided with a hollow head 11a having a counterbore 15a to provide a running clearance between the inner race 39 of bearing 24 and center 44 and the interior of the head and to provide a shoulder against which race 38 may abut and transmit the thrust load.

The bearings are mounted in the head in the same manner as those of Figs. 1, 2 and 3 and as no compensator assembly is employed no retaining ring is required but one may be used if desired. This form of the invention functions in the same manner as that previously described and it will therefore not be again set forth.

Although I have disclosed centers having but a single thrust bearing it is to be understood that two or more thrust bearings may be employed without departing from the spirit of the invention and in Fig. 5 I have illustrated a multiple thrust bearing center.

This construction is somewhat similar to that disclosed in Fig. 4 and comprises a housing 10b having a larger head portion 11b and a counterbore 15b for providing a shoulder to cooperate with the outer race of bearing 24 and transmit the thrust forces from center 44 to the housing. Disposed between bearings 23 and 24 is bearing 24a which is exactly similar to bearing 24 and they therefore have their races in abutting relationship and they both absorb the thrust forces. As in the first form of the invention the inner race 39a of bearing 24a is offset so as to provide a running clearance between the outer race 26 of bearing 23 and race 38a.

Although I have shown and described my invention as being applied to a metal working lathe it is to be understood that it is equally applicable to wood working and other lathes and may be changed over by merely replacing center 44 with the appropriate center.

From the foregoing disclosure it is apparent that I have provided novel tool centers which are rugged and simple in design, which will efficiently perform the work for which they are designed, and yet which are low in cost.

I claim as my invention:

1. In a lathe center, a supporting structure of generally cylindrical form and having a hollow head at one end thereof, said head having a cylindrical inner wall terminating in an axially facing opening, a plurality of anti-friction bearings disposed in said head and having the outer races thereof engaging said cylindrical wall, a center member mounted in the inner races of said bearings and projecting through the opening in said head, said head having an internal annular groove therein adjacent said opening, resilient means urging said bearings toward said opening, and retaining means disposed in said groove and abutting one of said bearings for restraining said bearings against axial displacement toward said opening and for forcing said retaining means into said groove.

2. The lathe center construction described in claim 1, wherein said last-named means comprises a resilient element frictionally engaging the bottom of said groove and abutting an axially facing surface provided on said bearing whereby said element is forced against the bottom of said groove.

3. In the lathe center, a hollow body having a portion adapted to be gripped in a lathe or the like, said hollow body being of generally cylindrical form and having an opening at one end thereof facing in the direction of its axis, a plurality of anti-friction bearings mounted in said body, each bearing comprising rolling means disposed between inner and outer races, the outer races of said bearings being disposed in engagement with the inner wall of said body, a center member mounted in the inner races of said bearings and projecting through said opening, resilient means disposed in said body and urging said bearings toward the opening thereof, releasable means mounted in said body adjacent the opening thereof for restraining said bearings against axial movement toward said opening, the outer race of one of said bearings having a surface overlapping said releasable means and operable to prevent the same from being released when said bearings are disposed in normal position.

4. The lathe center construction described in claim 3, wherein said releasable means comprises a snap ring sprung into a groove in said body.

5. The lathe center construction described in claim 3, wherein said releasable means comprises a snap ring sprung into a groove in said body and said one bearing race is provided with a surface designed to force said ring into said groove in response to axial movement of said bearing toward said opening.

6. In the lathe center, a hollow body having means for detachably securing it to a lathe or the like, said body being of generally cylindrical form and having an axially facing opening, a center holding and journalling assembly mounted in said body and comprising at least one anti-friction bearing having an outer race, resilient means for urging said assembly toward said opening, and means for restraining movement of said assembly toward said opening, comprising a ring member frictionally engaging a groove provided in said body and abutting a surface on said race, said surface being so formed as to exert both radial and axial forces upon said ring member in response to axial movement of said assembly toward said opening, to thereby lock said ring member in place.

7. The lathe center construction described in claim 6, wherein said surface of said race is of curved configuration, decreasing in diameter toward said opening, to wedge said ring member in place.

8. In a lathe center, a hollow body having a generally cylindrical inner surface, a center assembly mounted in said body and comprising a plurality of anti-friction bearings engaging said cylindrical wall, said body having an open end through which parts of said assembly project, a resilient unit urging said assembly towards said opening in said body, comprising an element mounted for guided axial movement in a passage in said body and adapted to undergo synchronous movement with said assembly and a resilient pressure exerting member acting against said element and reacting against an end wall provided in said body, and means for restraining said assembly against movement toward said opening.

9. The lathe center described in claim 8, wherein said element comprises a disc having an axially directed flange slidably disposed in said passage.

10. The lathe center described in claim 8, wherein said resilient pressure exerting member comprises at least one body of resilient deformable material, and a space is provided in said body to allow said material to expand.

11. The lathe center described in claim 8, wherein said element comprises a disc having an axially directed flange mounted for sliding engagement with the walls of said passage, and said resilient pressure exerting member comprises a mass of resilient deformable material acting against said disc and reacting against an end wall of said body located adjacent the outer end of said passage.

12. In a lathe center, a hollow body having an axially facing end opening, a center assembly mounted in said body and comprising a plurality of anti-friction bearings having inner races to receive a center member and outer races engaged with the inner surface of said body, the interior of said hollow body defining a lubricant reservoir for said bearings, and sealing means mounted between the inner and outer races of the bearing adjacent said opening for sealing said body against fluid leakage.

13. The lathe center described in claim 12, wherein said sealing means comprises a pair of axially spaced, split resilient plates extending between the inner and outer races and frictionally engaging the outer race of the bearing adjacent said opening and having a continuous sealing element clamped between them.

JOSEPH E. KLINE.